United States Patent Office 3,331,411
Patented July 18, 1967

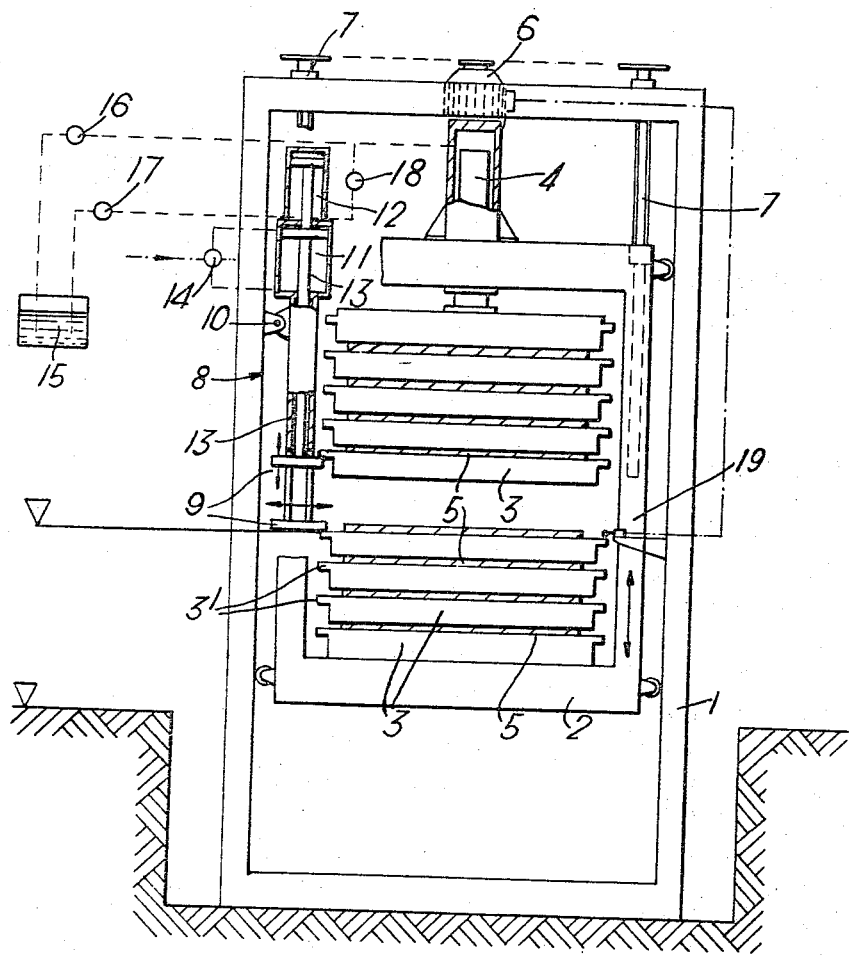

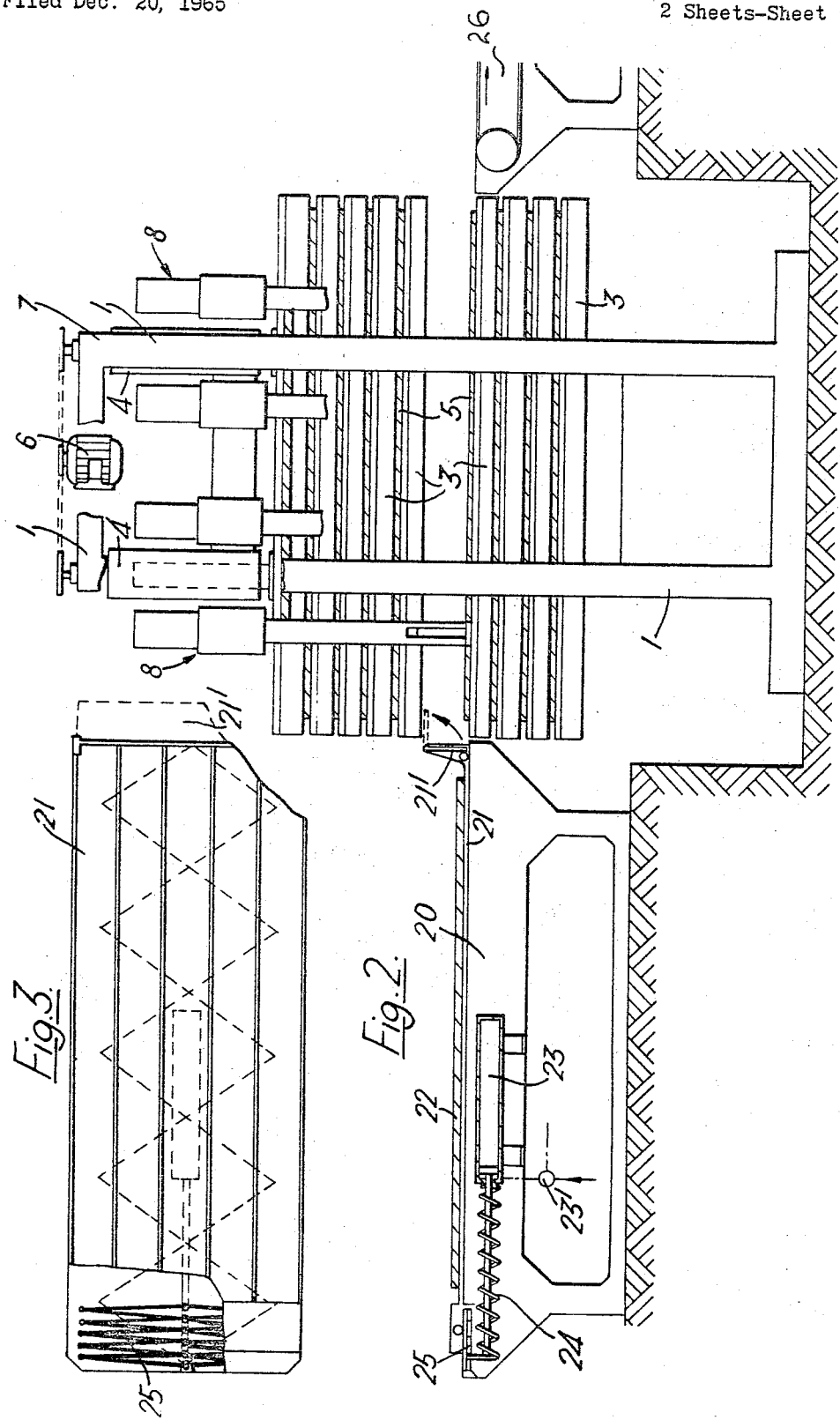

3,331,411
PRESS
Gianfranco Cecchi, Via Cagliero 19, Milan, Italy
Filed Dec. 20, 1965, Ser. No. 514,925
7 Claims. (Cl. 144—281)

The present invention relates to a quick acting press for use when gluing plane work pieces and in particular when gluing by hot or cold processes sheared boards, laminates, veneers and so forth, to hollow panels, chip panels, cellular panels and the like, and also for the production of plywood, chip panels and the like. In spite of the abovementioned preferred uses, the press of the present invention can also be employed for any other production wherein it is necessary to keep work pieces under pressure for a certain time by either hot or cold processes.

Multiple presses for gluing plane members have already been known and widely used for a long time especially in joinery. They are machines provided with frames within which there are inserted a number of boards and pressure means acting on said boards in order to tighten them together after the loading has been effected by inserting the work pieces between said boards. Such machines work very slowly because the loading of all the boards must be effected while the pressure means are at rest, the working takes place at the same time for all the work pieces and the unloading of the work pieces must be effected at the end of the operation, the pressure means being again at rest.

In other cases it is possible to load and unload independently the various boards, but it is always necessary to deactivate the pressure means before doing so. Furthermore said presses are provided with slow and irrational loading and unloading means, or they do not even provide such means and the loading and unloading operations must be made by hand.

A purpose of the present invention is to avoid the drawbacks mentioned above, and to permit a remarkable speeding-up of the operations in said presses.

The press as per the invention, of the type comprising a plurality of boards co-operating two by two with the work-pieces inserted therein and subject to the action of pressure means, provides working boards adapted to be detached and spaced apart from the adjacent board for the loading and unloading of the work pieces, maintaining the pressure substantially constant on the other boards, so that while the loading and unloading is being done from two adjacent boards, the treatment of the workpieces inserted between the other boards is not interrupted, the operation thus being continuous.

Preferably the boards of the press as per the invention are arranged within a strong frame bearing the pressure means and being associated within an outer framework with means adapted to detach the boards of each pair of boards sequentially from each other, keeping the boards spaced apart for a given time, said latter means and said strong frame reciprocally moving within said outer framework under the action of drive means mounted on the outer framework.

The invention also relates to means for loading and unloading the work pieces in a single operation. Said means comprise a movable table slowly entering the space between two spaced apart boards, thus throwing out the finished piece (which is then removed by a conveyor) and quickly retracting from said space in order to deposit by inertia a new piece to be worked on.

The invention will now be described in detail with reference to the enclosed drawings by way of non-limiting example:

In the drawings:

FIG. 1 shows a fragmentary partially diagrammatic front view of the press as per the invention, FIG. 2 is a side view of the press shown in FIG. 1, showing also the loading and unloading means, and FIG. 3 is a plan view of said means.

The machine shown in the drawings comprises an outer fixed framework 1 within which moves a mobile strong frame 2 provided with a series of boards 3 and pressure means 4 acting on said boards and consisting of two hydraulic cylinders. Said boards 3 are self-supporting and can be heated by internal circulation of hot water or steam, or by any other means. Work pieces 5 are inserted between each pair of boards.

The frame 2 is driven by an electric motor 6, mounted on the outer frame-work 1 through a screw transmission 7 causing the movement of the frame 2 and therefore of the heated boards when the motor 6 is in operation.

At the two opposite sides of the fixed outer framework 1 there are mounted hydro-pneumatically driven devices 8 which support at one end a system of cylinders and at the other end tongs 9 capable of being inserted between any two of the boards 3 engaging their projections 3' or the like, to cause the detachment of the boards from each other, while all the other remaining boards are maintained under the desired pressure. The devices 8 are mounted on the outer framework 1 as indicated in 10, so that they can move sidewise, moving away from the boards 3 in order to permit the movement of the movable strong frame and then approaching the boards themselves in order to permit the insertion of the tongs 9 between any pair of boards 3 and the engagement of said tongs 9 with the projections 3'. The devices 8, four on each side of the framework 1 in the illustrated embodiment, comprise a compressed air cylinder 11 and an hydraulic cylinder 12, said cylinders being co-axial and provided with pistons mounted on the same rod 13 driving the tongs 9. The compressed air is fed to the cylinder 11 through a selective valve 14. The hydraulic pressure cylinders 4 and the hydraulic cylinders 12 of the devices 8 are fed through the same circuit comprising a collecting tank 15, a pump 16 feeding the cylinders 4, a valve 17 between the tank and one end of cylinders 12 and a valve 18 between the same end of cylinders 12 and the duct between the pump 16 and the cylinders 4.

Numeral 19 indicates a microswitch stopping the movement of the strong frame 2 by interrupting the operation of the electric motor 6 the starting of which takes place through a remote control switch (not shown) which can be actuated by hand or driven automatically.

The microswitch 19 is located at the height of the working plane of the press, at the same height being located also the loading and unloading means to be described hereunder. The microswitch 19 is actuated by the projections 3' so that, independently of the thickness of the work pieces between the boards, each board stops at the level of the working plane.

Limit-switches (not shown) are provided to reverse the movement of the frame 2 within the framework 1 at the ends of the strokes.

The loading and unloading means (FIGS. 2 and 3) comprises a structure 20 bearing at the top a table 21 provided, at the end close to the press, with a normally vertical wall 21'.

The table 21 is longitudinally movable, and a work piece 22 to be inserted into the press is located thereon. The table 21 is at the same height as the working plane and is operated by a pneumatic cylinder 23, the piston of which can be longitudinally displaced at a relatively low speed towards the press and can return abruptly and quickly under the action of a strong spring 24. An articulated parallelogram linkage 25 amplifies the stroke of said piston. Furthermore the unloading means comprise a belt conveyor 26 on the side of the press opposite the one on which there is located the above mentioned unit. Another belt conveyor (not shown) can be arranged upstream of said unit, for feeding purposes.

The operation of the press is described starting with the frame 2 in its lowest position. Once the motor 6 is started, the frame 2 begins to rise, until the microswitch 19 is tripped. Then the frame 2 stops, the second of the boards 3 being at the level of the working plane. Then the devices 8 move towards the boards under the action of driving means of a known type (not shown) and engage, with their tongs 9, the projections 3' of the first two boards 3. The selective valve 14 permits the feeding of compressed air to the lower parts of cylinders 11, which cylinders cause the opening of the tongs 9 until the latter come into contact with the boards 3. During this movement the valve 17 is open and the cylinders 12 suck oil into their lower parts from the tank 15. When the tongs 9 come into contact with the projections 3' of the boards 3, the valve 17 closes and the valve 18 opens. The valve 18 connects the cylinders 12 to the cylinders 4. The total surface of the section of the pressure cylinders 4 being equal to the surface of the cylinders 12, the pistons of cylinders 11 can cause the detachment of the boards 3 by merely directing oil under high pressure from the pressure cylinders 4 into cylinders 11, overcoming only the actual weight of the parts and the friction.

The loading is now effected: compressed air is fed into cylinder 23 which moves the table 21 together with its workpiece 22 within the space between the two boards 3 spaced apart by tongs 9. Thus the return spring 24 is loaded. The wall 21' of the table 21 ejects the finished piece while the table 21 positions the new piece to be worked on. At the end of this operation the valve 23' opens discharging into the atmosphere the pressure of cylinder 23. Table 21 then quickly returns to its rest position under the action of spring 24. In order to be able to adjust the return speed of the table 21, the valve 23' can be choked at will.

In the quick return stroke of the table 21 the wall 21' remains uplifted as shown in dotted lines in FIG. 2, in order to permit the deposit by inertia of the new piece to be worked on, on a board 3 at the level of the working plane. While the conveyor 26 takes away the finished piece, the cycle of the devices 8 is reversed so that the boards 3 tighten and the tongs 9 are disengaged from the projections 3'.

The pump 16 serves to constantly maintain the pressure of the hydraulic circuit at a desired value, with the aid of an automatic pressure regulator (not shown).

The cycle of the operation can thus repeat, taking the third board 3 to the level of the working plane (please note that in the drawings the fifth and sixth boards are shown spaced apart).

By the press as per the invention it is possible to attain the advantage of a practically continuous operation never achieved so far; this is due to the fact that while one board is being loaded, all the others are maintained under the desired working pressure. Furthermore due to the particular hydraulic circuit, it is possible to obtain the detachment of the boards with a relatively small force, availing of a low pressure source of compressed air.

The work therefore proceeds quickly and continuously, and this is also due to the improved loading and unloading means.

The press can be automated by suitable arrangements not described herein. Furthermore, it is understood that the press can be in the form of embodiments different from the one described or improvements to the embodiment described herein.

For instance, the means moving frame 2 within the outer framework can be different from motor 6 and screw transmission 7. According to an alternative embodiment, hydraulic or pneumatic means suitably driven can be provided.

Also the loading and unloading system could be different; for instance it could be possible to avoid spring 24 and have the piston of the cylinder 23 move in both directions, with a different speed for each direction.

It is also understood that the hydraulic cylinders 4 could be in a different number from the two described, and the same thing can be said for the devices 8.

What I claim is:

1. A quick-acting press comprising a plurality of boards selectively separable from each other to permit the insertion and removal of workpieces therebetween, means for separating said boards from each other, means for pressing said boards together, and means for inserting and removing workpieces between said boards, said last-named means comprising a support, means for relatively slowly advancing the support between two spaced boards to eject a workpiece from between said two boards, and means for relatively quickly retracting said support from between said two boards in order to deposit by inertia a further workpiece between said boards.

2. A press as claimed in claim 1, said advancing means comprising a fluid-actuated cylinder and said retracting means comprising spring means.

3. A press as claimed in claim 1, said support carrying a pusher member thereon, said pusher member being mounted for vertical swinging movement out of the path of said workpieces in one direction only, thereby to push a finished workpiece from between the boards upon advancing movement of the support but to permit the travel of the pusher member past a further workpiece upon retracting movement of the support.

4. A quick-acting press of the type comprising a plurality of boards cooperating two by two with workpieces inserted therebetween, pressure means common to all the boards and disposed externally of the boards for pressing the boards toward each other in order to press the workpieces between the boards, and means for separating selected pairs of adjacent boards for the loading and unloading of workpieces, the last-named means overcoming the pressure of said pressure means while maintaining said pressure substantially constant on the other boards.

5. A press as claimed in claim 4, and an outer framework carrying said separating means, a frame movable within said outer framework and carrying said pressure means, drive means carried by said outer framework for moving said frame within said outer framework thereby to position selected boards adjacent said separating means, and means carried by said outer framework for moving said separating means into engagement with said selected pair of cooperating boards.

6. A press as claimed in claim 4, said pressure means and said separating means being fluid-pressure actuated, a first fluid circuit for feeding said pressure means and a second fluid circuit for feeding a first actuating member of said separating means, said first fluid circuit having a valve-controlled branch for feeding a second actuating member of said separating means cooperating with said first actuating member.

7. A press as claimed in claim 6, in which said pressure means comprises a piston-type fluid motor, and said first and second actuating members of said separating means comprise first and second pistons which slide in a cylinder, the area of said second piston being equal to the area of the piston of said piston-type fluid motor.

References Cited

FOREIGN PATENTS 159,283  1963  Russia.

WILLIAM W. DYER, JR., *Primary Examiner.*

R. J. ZLOTNIK, *Assistant Examiner.*